United States Patent [19]

Keller

[11] 3,996,443
[45] Dec. 7, 1976

[54] APPARATUS FOR THE MANUFACTURE OF REINFORCEMENT TRUSSES

[76] Inventor: Klaus Keller, Blumenstrasse 17, 8192 Geretsried 1, Germany

[22] Filed: Apr. 23, 1975

[21] Appl. No.: 570,848

[52] U.S. Cl. .............................. 219/56; 29/33 Q; 219/79; 219/80; 226/113
[51] Int. Cl.² .................................... B23K 11/10
[58] Field of Search ............ 29/33 Q, 33 S; 219/56, 219/57, 79, 80, 82; 226/104, 108, 113

[56] References Cited

UNITED STATES PATENTS

| | | | |
|---|---|---|---|
| 3,079,487 | 2/1963 | Rohr | 219/80 X |
| 3,158,731 | 11/1964 | Cape | 219/79 |
| 3,288,977 | 11/1966 | Keller | 219/79 |
| 3,641,303 | 2/1972 | Collins | 219/56 |
| 3,676,632 | 7/1972 | Ritter et al. | 219/56 X |

*Primary Examiner*—J. V. Truhe
*Assistant Examiner*—N. D. Herkamp
*Attorney, Agent, or Firm*—Finnegan, Henderson, Farabow & Garrett

[57] ABSTRACT

A machine for fabricating structural elements such as reinforcement trusses or girders wherein spaced flange elements are welded to a continuous, zig-zag shaped web to form a composite beam. The machine bends flat strands to form the zig-zag webs and then feeds them continuously to a welding means where the webs and flange elements are welded on an intermittent basis into an integral unit.

9 Claims, 6 Drawing Figures

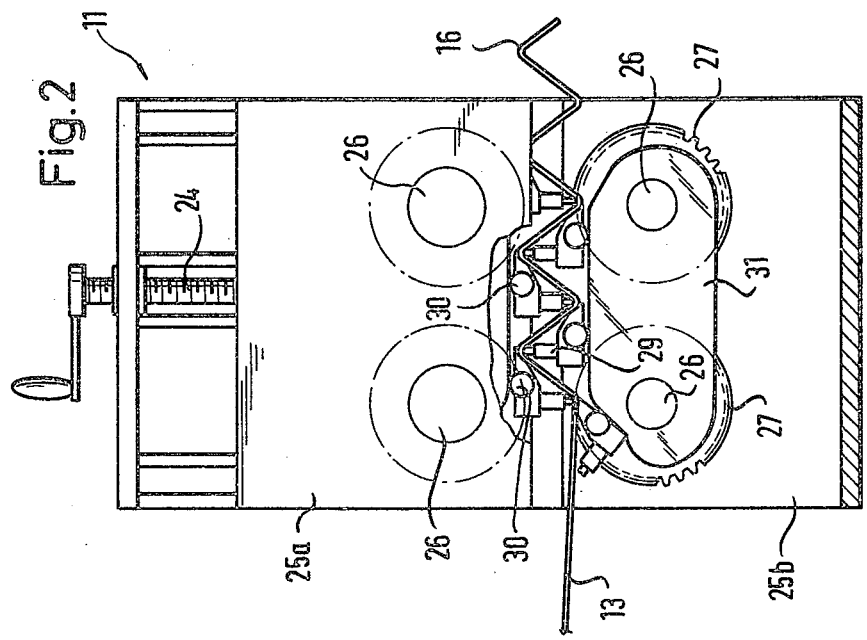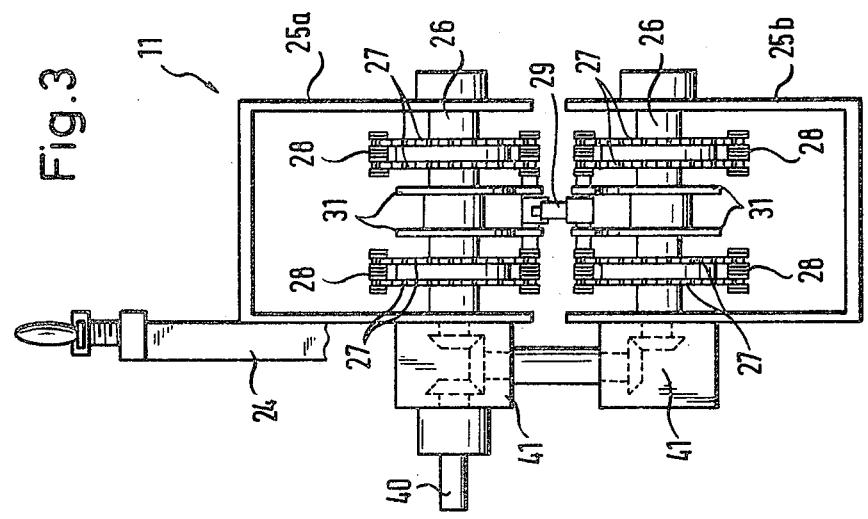

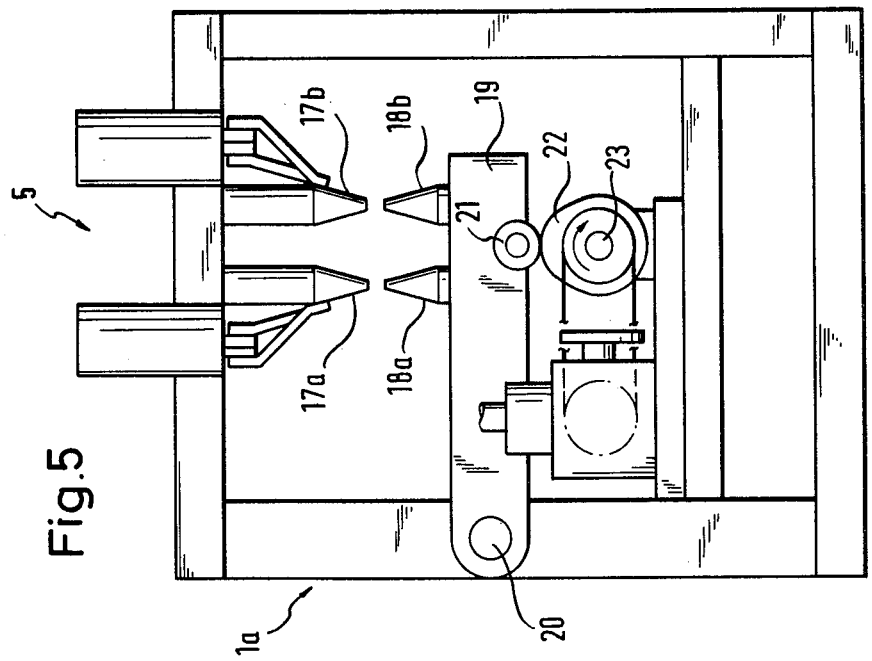
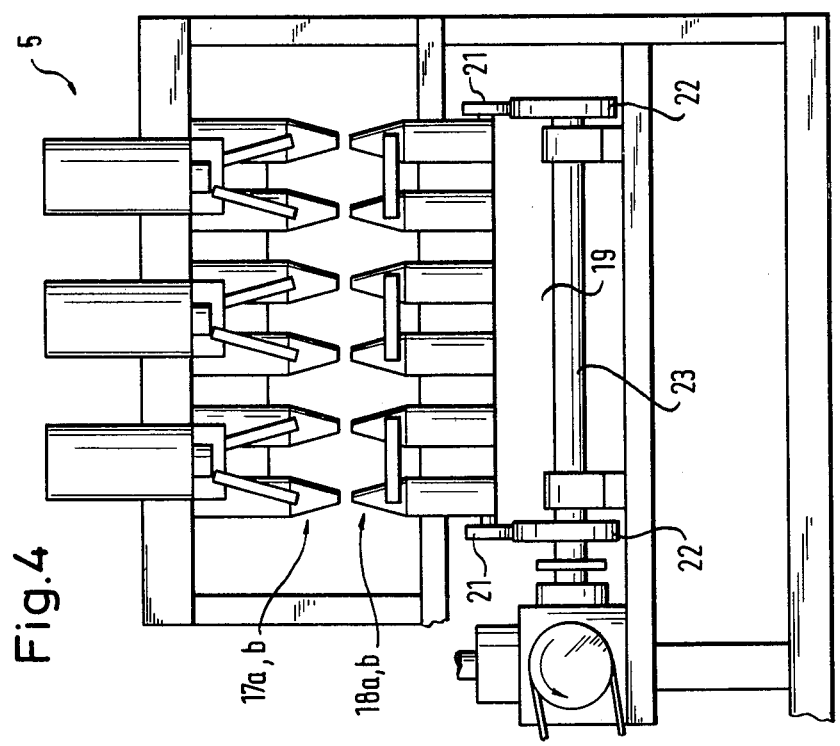

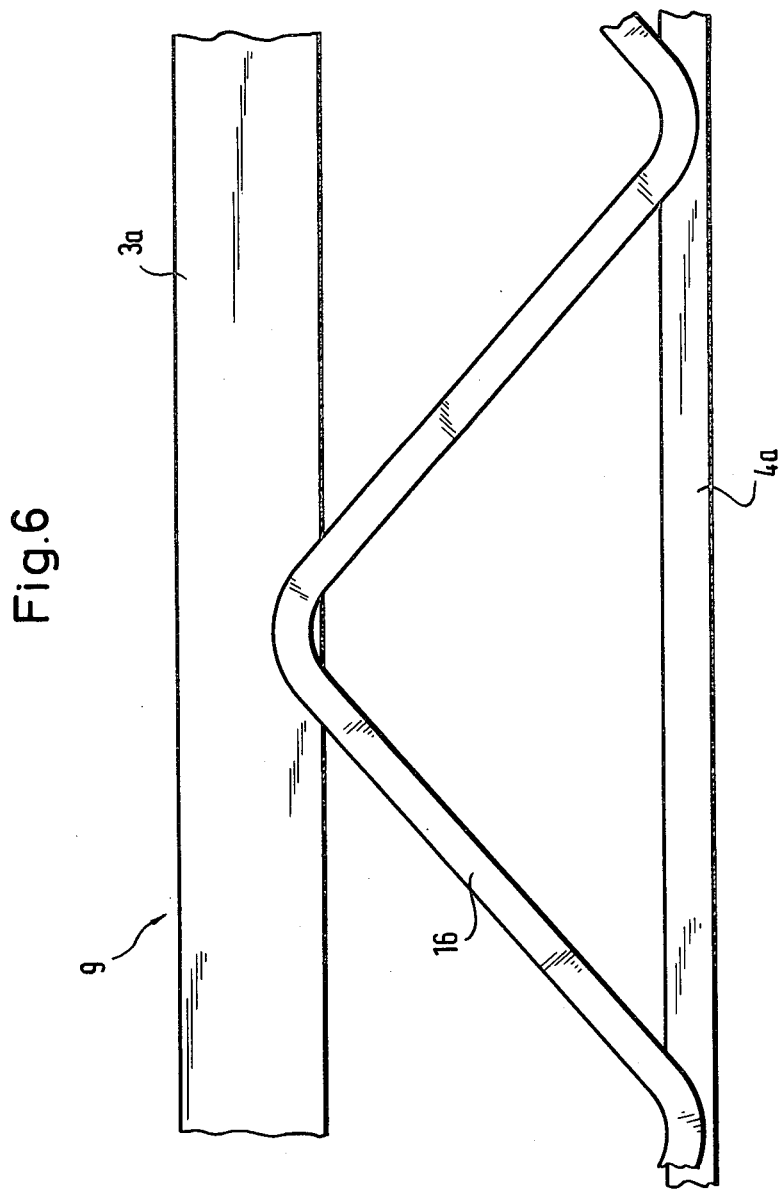

APPARATUS FOR THE MANUFACTURE OF REINFORCEMENT TRUSSES

This application relates to apparatus for manufacturing reinforcing trusses and, more particularly, to the manufacture of reinforcement trusses containing continuous zig-zag shaped webs welded at spaced intervals to lateral flange elements.

Girders of various types are produced for industrial and other uses. The present invention is concerned with the making of fabricated girders wherein diagonally disposed struts are made integral with flanges for the beams, in forms such as the Warren Truss and the like. In such girder or beams a composite structure is made by welding top and bottom flanges to the opposite ends of struts that may be disposed at various angles with respect to the flanges, the struts taken all together forming the web. The struts may take the form of individual bars or a strand of suitable material may be bent to a desired pattern to produce a web that is designed to be welded to the flanges to complete the girder.

In the past serpentine strands have been formed on intermittently operative machines that are somewhat inefficient because of the masses that must be intermittently moved back and forth to produce the desired pattern in the bent strand. In other machines operating on a continuous cycle for forming a serpentine web, the necessarily intermittent nature of the welding steps requires that the work is performed on separate equipment not integrated with the welding operation. Thus, it has not been possible heretofore to continuously form a serpentine web for use in the production of a composite beam by welding flanges thereto in a unitary and coordinated bending and welding apparatus.

BRIEF DESCRIPTION

The present invention relates to equipment for manufacturing structural elements in the form of girders such as Warren trusses, the apparatus having a bending system for deforming a strand-like material into a serpentine shape forming a web means and with a step-wise or intermittently operating welding system for welding lower and upper chords or flanges thereto, which flanges also may be made from a strand-like material. The flanges are welded to the peaks and valleys of the roughly sinusoidal shape of the serpentine web means.

Bending means of any known design may be used to shape the flange elements as well as the web. As will be seen more fully below, the bending means of this invention is designed to operate on a continuously moving cycle while the welding and finished girder feed means operate on an intermittent cycle. The strand-like material for forming the web is shaped into zig-zag or serpentine form between jaws moving to and fro, while simultaneously the upper and lower chords are being welded to a stationary section of a previously formed section of the web.

This problem of combining a continuous web forming operation with an intermittent welding cycle is solved by this invention in that upon leaving the continuously operating bending system and prior to entering the welding system, the serpentine web is guided through a path in the form of a resilient loop that acts as a buffer between the continuous output of the serpentine web bending system and its stepwise or intermittently operated further processing in the welding system.

More particularly, the present invention relates to a machine for the manufacture of composite trusses comprising spaced chords and serpentine-shaped connecting webs comprising a continuously operative bending means for continuously shaping a strandlike material into a serpentine web and for feeding it to a welding station, means for feeding the chord elements to the welding station, welding means operating intermittently at said station and including stationary welding electrodes for welding the spaced chords to the peaks and valleys of said serpentine web to form the corporate truss, means to actuate said stationary electrodes on an intermittent cycle, said bending means being supported in a spaced relation with respect to said welding electrodes so that said serpentine web upon leaving the continuously operating bending means and prior to being fed with said chord elements into the welding means forms a resilient loop and creates a buffer between the continuous output of serpentine web from the continuously operative bending means and its step-wise further processing by the stationary electrodes.

The equipment of the invention thus provides a resilient loop between the web bending apparatus and the welding station, which allows for compensation between the continuous manufacture of the struts forming the web means and the step-wise operation of the welding system for permanently bonding the flanges of the girder to the web. By combining a continuously operating bending system with a step-wise operating welding system, very high outputs will be obtained with a very simple machine design. It has been found that the serpentine web may be formed and then further bent into an expansion loop without there being any residual, undesired deformation in the web that could be harmful to the finished girder structure.

Preferably the bending equipment is located above the welding station for completing the composite truss and the resilient loop is turned downwardly through about 180° so that the serpentine web leaves the bending system essentially in the direction opposite to the advance of the composite truss structure through the welding station. A compact, over-all machine will be obtained on the basis of a bending system so arranged. This effect may be further improved by mounting the welding system at least partly underneath the expansion loop.

The desired simple machine design will be achieved to an especially high degree if a central drive motor is provided, which will drive both a power take-off unit for continuously actuating the bending system and a cam system for controlling the step-wise actuation of the welding system, and a second power take-off means for driving a slide-clamp adapted to move to and fro for advancing the completed composite truss structure leaving the welding station.

The preferred form of the invention thus makes use of a single drive motor to continuously power the bending system, to effect the step-wise operation of the welding system, and to advance the composite truss structure step-wise by means of the slide clamp that has a reciprocating action. The power transmission units and the transmission or reduction ratios in the gears may easily be so adjusted that, taking into account the resilient loop formed in the serpentine web between the output of the bending system and the welding station, a continuous web formation can be performed and coordinated with intermittent welding in the welding system and the step-wise advance of the composite truss by means of the reciprocating clamp and truss feed means.

IN THE DRAWINGS

The drawings show a preferred embodiment of the invention in which:

FIG. 2 is a top view partly broken away, of the bending means for forming the serpentine web of the girder being fabricated by the apparatus;

FIG. 3 is a front view of the bending means shown in FIG. 2;

FIG. 4 is an enlarged fragmentary side view of the welding station of the apparatus;

FIG. 5 is an end view of the welding station shown in FIG. 4; and

FIG. 6 is a side view of part of a structure being produced one form of which is known as a Warren Truss, by the apparatus of FIG. 1.

DETAILED DESCRIPTION

Figure 1:
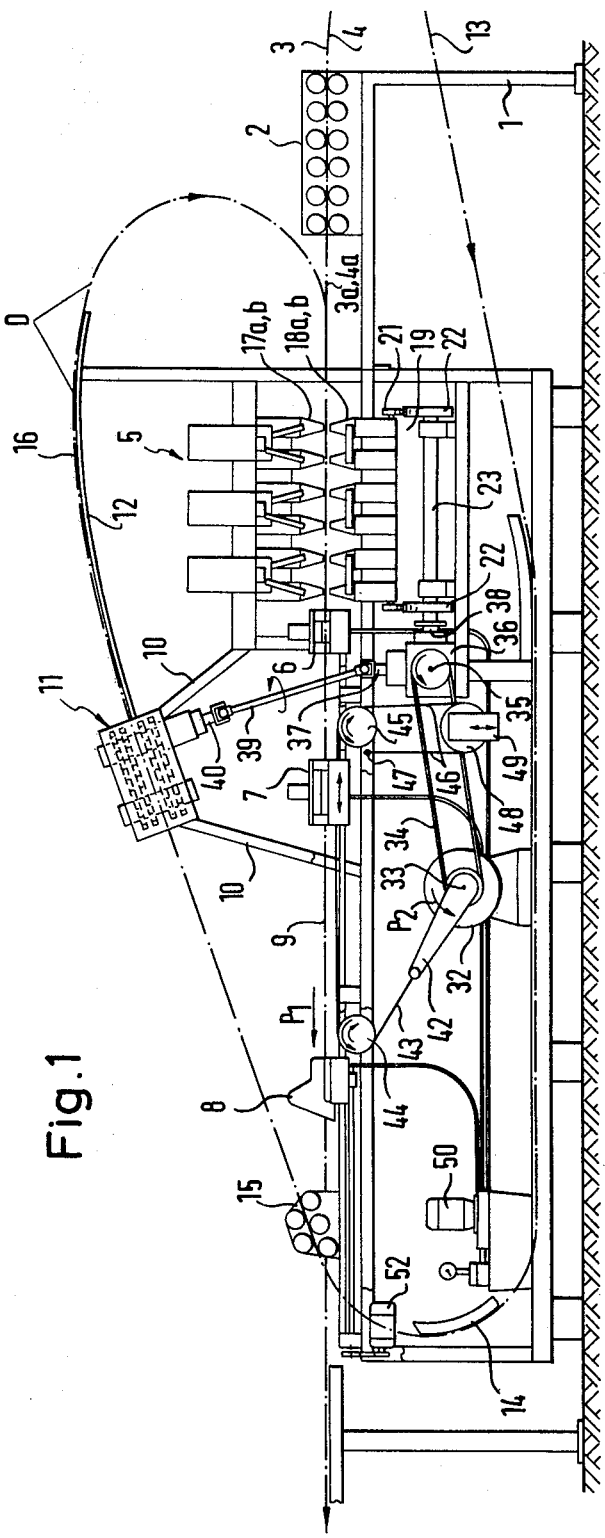
FIG. 1 is a diagramatic side-view of the web bending and welding apparatus of the present invention.

The apparatus of the invention is supported by a suitable frame structure 1. A roller system 2 is provided in the preferred form of the apparatus, at the input end of said structure, said system of rollers being provided for the purpose of truing and shaping strands of material 3 coming from supply coils (not shown) to produce cross-sectional shapes suitable for use as upper and lower chords or flange elements for the beam. This system of rollers 2 is positioned in front of a welding station 5. A stationary clamp means 6 is positioned at the outlet end of the welding station 5 and a sliding clamp 7 moving to and fro is located downstream from the position of clamp 6. A severing means 8 is located further downstream from clamp 7 to cut off measured lengths as desired of the continuously formed beam. As the composite beam structure is completed, as indicated by dot and dash line 9, it lies horizontally.

A bending unit 11 is carried upon frame 1 by posts 10 supported above the main plane occupied by completed truss 9. A guide 12 is connected to the outlet of the bending unit, the guide being disposed to initially direct the formed serpentine web in a direction opposite the flow direction indicated by arrow $P_1$ of the fabricated composite truss 9. The web material 13, which is supplied in a continuous strand form, is fed to the bending unit 11 from a suitable source of supply not shown, and, as shown by the arrows in FIG. 1, passes through the lower part of structure 1, where it is deflected upwardly by a rail 14, through a roller truing system 15 positioned laterally of the previously completed composite truss 9, and into the bending unit 11 to be formed into a serpentine or other shaped web means 16.

As indicated above, the formed web 16 moves initially in a direction over guide 12 that is opposite to the flow direction $P_1$ of the truss 9. The serpentine web 16 then will be deflected through a U-shaped or 180° turn in a downwardly direction, to be fed together with the strand-like upper and lower chords 3 and 4 into the welding station 5. Because of this arrangement, a resilient or expansion loop D will be formed in the serpentine web 16 between bending unit 11 and welding station 5.

The composite truss 9 which typically herein is illustrated in the form of a Warren Truss, is shown in greater detail in FIG. 6. It consists of a serpentine web 16, an upper chord or flange 3 and a lower chord or flange 4, which flange means were initially formed to the desired shape in roller system 2. The flanges are welded to the serpentine web at welding station 5 at the peaks and valleys of the serpentine or somewhat sinusoidal curve of the web. The specific cross-section shape of the upper and lower chords 3 and 4 depends on the particular requirements of the truss design. Bar-like upper and lower chords or L-shaped angle iron flanges may be used. As a rule the web material 16 will be circular in cross-section. The flanges 3 and 4 may be welded to the top and bottom of the web on one side only as shown in FIG. 6, or on both sides of the web at the top and bottom thereof if a stiffer beam structure is needed.

FIGS. 4 and 5 show the welding station in greater detail. It comprises a set of upper, fixed welding electrodes 17a, 17b and a set of movable lower welding electrodes 18a, 18b. Welding electrodes 17a and 17b and also electrodes 18a and 18b are spaced apart horizontally along the line of motion $P_1$. The vertically aligned pairs of welding electrodes 17a and 18a, and 17b and 18b will weld upper and lower chords 3 and 4 to the respective inversion points or peaks and valleys of the serpentine web 16 respectively.

The lower welding electrodes 18a and 18b are mounted on a suitable carrying frame supported on a bar 19 pivotably supported at 20 to a fixed part of support structure $1_a$. Bar 19 rests at its opposite ends on cam rollers 21 that cooperate with cams 22, which in turn are keyed to a horizontal shaft 23. Lower welding electrodes 18a, 18b may be lifted and lowered thereby in synchronism with the welding sequence by means of cams 22. Welding station 5 further comprises known electrical components and guiding means for keeping the flange elements 3 and 4 and web material 16 in the proper position for welding. These electrical and guiding components are conventional and have been omitted from the drawings for the sake of clarity since they are not essential to illustrate the invention.

Bending unit 11 as shown in FIGS. 2 and 3 comprises two housing halves 25a and 25b which may be adjustably moved with respect to their mutual spacing by means of a worm drive means 24 partially illustrated in the Figures. Rotatably driven shafts 26 are supported in pairs in each housing half, which shafts in each case support two pairs of sprocket wheels 27. Double chains 28 of the conventional roller-type pass around each cooperating pair of sprocket wheels. The adjacent elements of roller-chains 28 carry compatible bending tools 29 having a pitch appreciably larger and opposite the chain pitch, which tools 29 have feeler rollers 30 that ride on fixed guide rails 31 (see FIG. 3). Alternate bending tools 29 will grip the strand-like material 13 from its opposite sides in the manner shown in FIG. 2 and as the strand moves continuously through the bending unit force it into the desired serpentine shape for web 16 as is known in the art.

As shown in FIG. 1, the various clamping, cam driving and web forming devices of this apparatus are driven from a central drive motor 32 either directly or through a reduction gear and power take off from a main shaft 33 by means of a belt or chain drive 34 that actuates the input shaft 35 of a gear box unit 36. A first driven shaft 37 and a second one, 38, are driven by said gear box unit. The first shaft 37 is connected through a universal joint to shaft 39 that connects with a drive shaft 40 which, by means of bevel-gearing 41 (see FIG. 3) drives shafts 26 of bending unit 11. The second drive shaft 38 is coupled to the cam drive shaft 23 for rotating cams 22.

A crank 42 is keyed to rotate with main shaft 33, a flexible cable 43 being mounted at the free end of said crank. Said cable is passed over a first guide roller 44 mounted on structure 1 and fixedly connected to the slide clamp 7 and then the cable continues past said slide clamp over a second guide roller 45, which is also supported by structure 1. The cable forms a downward loop 46, the free end of the cable being connected to the structure 1 at 47. A return weight 49 is suspended in the loop 46 by means of a roller 48.

A suitable hydraulic control unit 50 shown in FIG. 1 communicates by means of flexible hydraulic lines with hydraulic cylinders in fixed clamp 6, slide clamp means 7 and the severing system 8. The hydraulic system includes control valves that may be actuated by convention control means (not shown) under the control of cams 22 to close clamp 6 when the welding cycle is being performed and to release clamp 6 and engage slide clamp 7 to feed the completed section forwardly in between welding cycle, all in properly timed relation.

In operation, drive motor 32 is actuated to drive chains 28 of bending unit 11 through gear box 36 and shaft 39. Bending tools 29 grip the strand-like material 13 that passes between them and shape it into the desired serpentine web means 16, said material being continuously advanced. The serpentine web 16 continuously leaving bending unit 11 is fed into welding station 5 together with the upper and lower chords 3 and 4 that are fed into the machine by roller apparatus 2.

The common drive motor 22 through gear box 36 also continuously rotates horizontal cam drive shaft 23. Support bar 19 is synchronously pivoted up and down by means of cams 22 and cam rollers 21 and thereby moving the lower sets of elctrodes, 18a and 18b into welding position with respect to upper electrodes 17a, 17b. Clamp 6 engages the chords and web elements as the sections of the upper and lower chords 3 and 4 are welded to the peaks and valley portions of the serpentine web 16 by the electrodes 17 and 18. When the material is held at rest by clamp 6 during this welding step, expansion loop D will enlarge since, as explained above, the web 16 is continuously advanced from unit 11. When the lower sets of electrodes 18a, 18b are lowered, the finished portion of the composite truss is then moved out of welding station 5 by releasing clamp 6 and reciprocating clamp 7. Expansion loop D will then decrease permitting the finished welded truss to advance sufficiently to bring the next section of chords and web to be welded into welding station 5.

Slide clamp 7 can grip welded truss 9 by means of a conventional hydraulic clamping apparatus (not shown) actuated by hydraulic control unit 50. Then by rotating crank 42 in the direction of arrow $P_2$, the flexible line 43 will be pulled down, carrying slide clamp 7 of FIG. 1 towards the left and moving truss 9 the desired distance. Loop 46 in flexible link 43 will thereby be shortened so that weight 49 is lifted. When the free end of the crank has rotated 180° from its starting position as shown in FIG. 1, the hydraulic system 50 is actuated in time relation therewith to release the clamping action of slide clamp 7 with respect to truss 9 so that upon further motion of crank 42, slide clamp 7 will be free to move back to the right by weight 49. The stationary clamp 6 will simultaneously be closed hydraulically with the opening of the slide clamp 7 in order to lock the truss in a fixed position so that the next section of the flanges and web may be joined together at the welding station.

Separation means 8 may be hydraulically driven from time to time in cooperation with this intermittent feeding motion to sever the desired length of completed truss structure from welded truss 9 issuing from the welding machine. This length may be selected by having the position of the severing means 8 controlled by a worm drive that may be actuated by a separate motor 52, said worm being supported on structure 1 and being adapted to position the cutter longitudinally toward or away from the welding station as desired. Any suitable cutting tool may be used to sever the truss.

The invention should not be considered restricted to the particular embodiment shown in the drawing. For example, expansion loop D may also be mounted in the apparatus in another spatial arrangement depending upon the placement of the bending unit with respect to the welding station. Furthermore, other power transmission units, interrelated timing means and gearing units may be provided. The bending mechanism may also differ in its particulars from those shown.

The essential feature of the invention lies in the means providing for the continuous production of the serpentine web that cooperates with the step-wise welding procedure by which the web is attached to the upper and lower chords and the subsequent intermittent separation procedure of desired lengths of completed truss elements from the welded truss stock. It is apparent that many modifications of this invention may occur to those skilled in the art that will fall within the scope of this invention as defined in the following claims.

I claim:

1. Apparatus for the manufacture of composite trusses comprising spaced chords and serpentine-shaped connecting webs comprising continuously operative bending means for continuously shaping a strand-like material into a serpentine web and for feeding it to a welding station, means for feeding the chord elements to the welding station, welding means operating intermittently at said station and including stationary welding electrodes for welding the spaced chords to the peaks and valleys of said serpentine web to form the composite truss, means to actuate said stationary electrodes on an intermittent cycle, said bending means being supported in a spaced relation with respect to said welding electrodes so that said serpentine web upon leaving the continuously operating bending means and prior to being fed with said chord elements into the welding means forms a resilient loop and creates a buffer between the continuous output of serpentine web from the continuously operative bending means and its step-wise further processing by the stationary electrodes.

2. Apparatus as defined in claim 1, in which said bending means is mounted above the main plane of the completed composite truss leaving the welding electrodes and is so situated that the serpentine web essentially leaves the bending means in a direction opposite to the direction in which the completed truss moves out of the welding station and in that said serpentine web upon leaving the bending means will be turned downwardly in a U-shaped arc to form the resilient loop.

3. Apparatus of claim 2 in which the completed truss moves out of the welding station in an essentially horizontal direction and the serpentine web essentially leaves the bending means in an upwardly inclined as well as opposite direction thereto.

4. Apparatus as defined in claim 2, in which said welding electrodes are mounted at least partly underneath said resilient loop.

5. Apparatus as defined in claim 1, including guide means for supporting a portion of said resilient loop immediately beyong said bending means.

6. Apparatus as defined in claim 1, including a central drive means for continuously driving the bending means, and for driving cam means for intermittently actuating said electrodes, and a slide clamp for intermittently advancing the composite truss leaving the electrodes.

7. Apparatus as defined by claim 6, in which the central drive means includes a drive motor, a crank continuously rotated by the drive motor, a flexible draw-link having one end fastened to the free end of said crank and passing over a pair of guide rollers situated at the opposite ends of the path of movement of the slide clamp, an intermediate portion of said drawlink between said rollers being connected to said slide clamp, said draw-link being held in a fixed position at its other end after forming a downwardly hanging loop, and a weight attached to the looped portion of the link, whereby the crank pulls the clamp in one direction and the weight returns it to its initial position.

8. Equipment for the manufacture of a composite structure made by welding upper and lower chord elements to a serpentine web to form a Warren Truss comprising bending means for shaping a strand of material into a serpentine web, supply means for continuously feeding material to said bending means, drive means for continuously operating said bending means, upper and lower chord feeding means, means to drive said chord feeding means intermittently to feed said chords into aligned position with respect to said web, welding means having electrodes mounted in a fixed location for welding a section of said chords to the peaks and valleys of said serpentine web, means to engage said electrodes against said chords and web during a welding cycle to produce said composite truss, said bending means being spaced from said welding means a sufficient distance such that said serpentine web forms a resilient expansion and contraction loop between the continuously producing bending means and the intermittently operated welding means.

9. Apparatus for the manufacture of composite trusses comprising spaced chords and serpentine-shaped connecting webs comprising continuously operative bending means for continuously shaping a strand-like material into a serpentine web and for feeding it to a welding station, means for feeding the chord elements to the welding station, welding means operating intermittently at said station and including stationary welding electrodes for welding the spaced chords to the peaks and valleys of said serpentine web to form the composite truss, means to actuate said stationary electrodes on an intermittent cycle, said bending means being supported in a spaced relation with respect to said welding electrodes so that said serpentine web upon leaving the continuously operating bending means and prior to being fed with said chord elements into the intermittently operating welding means reverses direction approximately 180° and forms a free, resilient loop to create a buffer between the continuous output of serpentine web from the continuously operative bending means and its further processing by the stationary electrodes of the intermittently operative welding means.

* * * * *